June 5, 1962  A. C. DE KLERK  3,038,111
VOLTAGE REGULATOR CIRCUIT ARRANGEMENT
Filed Oct. 31, 1958
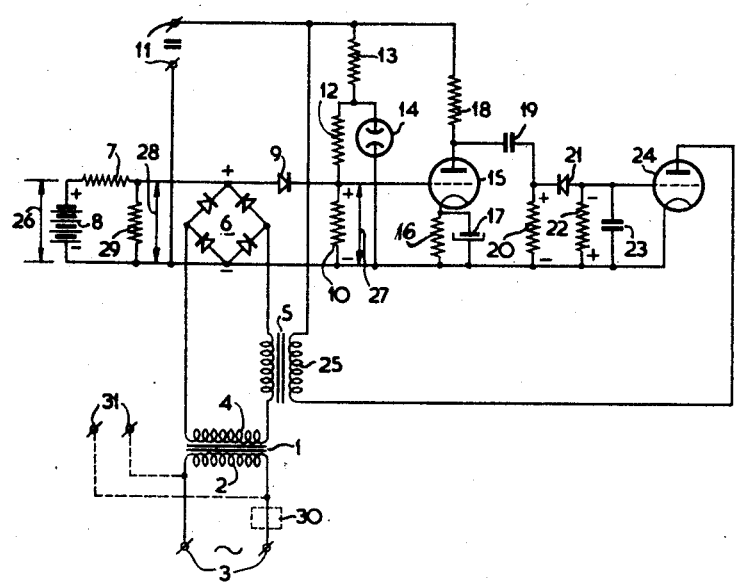
INVENTOR
ANTONIE CORNELIS DE KLERK
BY
AGENT

United States Patent Office 3,038,111
Patented June 5, 1962

3,038,111
VOLTAGE REGULATOR CIRCUIT
ARRANGEMENT
Antonie Cornelis De Klerk, Hilversum, Netherlands, assignor to North American Philips Company, Inc., New York, N.Y., a corporation of Delaware
Filed Oct. 31, 1958, Ser. No. 771,103
Claims priority, application Netherlands Nov. 7, 1957
6 Claims. (Cl. 321—18)

This invention relates to a circuit arrangement for supplying a load with a controllable output voltage associated with a ripple voltage of a rectifier. The rectifier is supplied from an alternating voltage means through a saturable reactor. The output voltage of the rectifier is supplied to a controllable amplifier. The output direct current of the amplifier controls the direct-current magnetization of the saturable reactor to compensate for undesirable variations in the output voltage of the rectifier in accordance with variations in the input voltage.

Such an arrangement is known from British patent specification No. 677,673. This arrangement requires a stabilised supply for two controllable direct-voltage amplifier valves so that a comparatively complicated arrangement results which is not very economical. Furthermore the mean value of the output direct voltage is regulated with no allowance being made for the ripple voltage superimposed thereon which, particularly due to the use of a saturable reactor, may exhibit sharp peaks.

For certain applications such as, for example, the charging of storage cells and more particularly silver-zinc storage cells, this is impermissible. In the latter case the entire voltage including the ripple voltage should on no account eceed 2.2 volts per cell towards the end of the charging process, while the current also must gradually fall to zero, since otherwise the life of the cells is adversely affected.

According to the invention this disadvantage is obviated and the maimum permissible output direct voltage of the rectifier is accurately limited in that the load is supplied from the rectifier through a resistor. The output voltage of the rectifier is supplied to a comparison device and compared with a reference stabilised direct voltage so that, if the ripple voltage exceeds the stabilised voltage, a resultant alternating voltage is produced which is supplied to the control circuit of an alternating-voltage amplifier and that the output alternating voltage thereof is supplied, through a second rectifier, to the saturable reactor.

According to a further feature of the invention the positive output terminal of the rectifier is connected, through the anode of a third rectifier in series with the positive or negative terminal of the stabilised direct-voltage supply, to the negative terminal of the rectifier. The positive and negative terminals of the stabilised voltage supply are connected to the control circuit of the alternating-voltage amplifier.

In order that the invention may readily be carried out, one embodiment thereof will now be described, by way of example, with reference to the accompanying diagrammatic drawing.

A primary 2 of a transformer 1 is connected to an alternating-voltage supply 3. The secondary 4 is connected, through a saturable reactor 5, to a rectifier 6. The output voltage 28 of the rectifier 6 charges a battery of silver-zinc storage cells 8 through a resistor 7. The positive terminal of the rectifier 6 is connected, through the anode of a second rectifier 9 in series with a resistor 10, to the negative terminal of the rectifier 6. Across the resistor 10 there is set up a stabilised direct voltage supplied from a direct-voltage supply source 11 by means of a potentiometer arrangement 12, 13 and a neon tube 14. The voltage across the resistor 10 may, for example, be n times 2.2 volts less a few tenths of volts, if the number of cells of the battery 8 is n.

The resistor 10 is connected in the grid circuit of an alternating-voltage amplifier 15 having a cathode resistor 16 and a capacitor 17. The valve 15 is supplied through an anode resistor 18. The anode of the valve 15 is connected, through a capacitor 19, to a resistor 20 which together with an auiliary rectifier 21, a resistor 22 and a capacitor 23 is connected in the grid circuit of an amplifier valve 24. The anode of the valve 24 is connected to the positive terminal of the direct-voltage source 11 through a direct-current winding 25 of the saturable reactor 5.

The circuit arrangement operates as follows:
When the battery 8 is charged, the not (completely) smoothed rectified charging current traverses the resistor 7 and produces an alternating voltage across this resistor. When the full voltage of the battery 8 is nearly reached and voltage peaks at the output of the rectifier 6 threaten to exceed the permissible value of 2.2 volts per cell, the regulation sets in. As soon as the alternating voltage across the resistor 7 superimposed with the voltage 26 of the battery 8 exceeds the slightly lower direct voltage 27 across the resistor 10, this alternating voltage is supplied, through the rectifier 9, to the resistor 10, amplified by the valve 15 and set up across the resistor 20 through the capacitor 19. By the auxiliary rectifier 21 this voltage is rectified so that the anode current of the valve 24 decreases with the result that the impedance of the saturable reactor 5 increases and the output voltage of the rectifier 6 decreases.

In order to enable the operating point to be correctly adjusted on the operating characteristic curve of the saturable reactor 5, use is preferably made of a base load in the form of a resistor 29 connected across the output of the rectifier, for if the storage cell is completely charged, the voltage 26 must be equal to the voltage 28, since charging current must no longer flow. However, this would require the saturable reactor 5 to have an infinitely high impedance and this is naturally impossible. If the saturable reactor is connected in series with the primary 2, the no-load current of the transformer 1 can serve as the base load. If this should be insufficient, the amplifier 15 and the rectifier 21 may act as the base load if the saturable reactor is provided at the primary side of the transformer, as is shown in broken lines by 30, and the rectifier for supplying a direct voltage 11 is connected to terminals 31 which are likewise shown in broken lines.

In a test arrangement a charging voltage could be kept substantially constant with a variation of less than 0.1 volt per cell with mains voltage variations from −35% to +35%.

What is claimed is:
1. A voltage regulator circuit arrangement for regulating the voltage across a load, said load being connected across the output of first means having an input for an alternating voltage source of given frequency and an output across which is produced a direct output voltage having an alternating current component at a frequency numerically related to the said given frequency, comprising second means having an input and an impedance dependent upon the magnitude of current supplied to said input, means for applying said alternating voltage to the input of said first means through said second means, a source of direct reference voltage, means for comparing said reference voltage with the peak value of said output voltage during duty cycles of said alternating current component when said alternating current component causes said output voltage to exceed said reference voltage in magnitude to produce a resultant correction voltage and to produce a control current dependent upon the magnitude of said resultant correction voltage, and means for supplying said control current to the input of said second means thereby to increase the magnitude of said impedance and reduce the magnitude of the input voltage applied to the input of said first means.

2. A voltage regulator circuit arrangement for regulating the voltage across a load, said load being connected across the output of rectifying means having an input for an alternating voltage source of given frequency and an output across which is produced a direct output voltage having an alternating current component at a frequency numerically related to said given frequency, comprising saturable reactor means having a control coil and an impedance dependent upon the magnitude of current in said control coil, means for applying said alternating voltage to the input of said rectifying means through said saturable reactor means, a source of direct reference voltage, means for comparing said reference voltage with the peak value of said output voltage during duty cycles of said alternating current component when said alternating current component causes said output voltage to exceed said reference voltage in magnitude to produce a resultant direct correction voltage and to produce a control current dependent upon the magnitude of said resultant correction voltage, and means for supplying said control current to the control coil of said saturable reactor means thereby to increase the magnitude of said impedance and reduce the magnitude of the altervoltage applied to the input of said rectifying means.

3. A voltage regulator circuit arrangement for regulating the voltage across a load, said load being connected across the output of rectifying means having an input and an output across which is produced a direct output voltage having an alternating current component, comprising a resistor interposed between said load and the output of said rectifying means, saturable reactor means having a control coil and an impedance dependent upon the magnitude of current in said control coil, means for applying an alternating voltage to the input of said rectifying means through said saturable reactor means, a source of direct reference voltage, means for comparing said reference voltage with the peak value of said output voltage during each duty cycle of said alternating current component when the said output voltage exceeds the said reference voltage in magnitude to produce a resultant correction voltage, means for amplifying said correction voltage, means for rectifying the amplified correction voltage, and means for applying the rectified correction voltage across the control coil of said saturable reactor means thereby to increase the magnitude of said impedance and reduce the magnitude of the alternating voltage applied to the input of said rectifying means.

4. A voltage regulator circuit arrangement for regulating the voltage across a load, said load being connected across the output of rectifying means having an input and an output across which is produced a direct output voltage having an alternating current component, comprising a first resistor connected in series circuit arrangement with said load and interposed between the said load and the output of said rectifying means, a second resistor connected in parallel with said series circuit arrangement and interposed between said load and the output of said rectifying means, saturable reactor means having a control coil and an impedance dependent upon the magnitude of current in said control coil, means for applying an alternating voltage to the input of said rectifying means through said saturable reactor means, a source of direct reference voltage, means for comparing said reference voltage with the peak value of said output voltage during earch duty cycle of said alternating current component when the said output voltage exceeds the said reference voltage in magnitude to produce a resultant correction voltage, means for amplifying said correction voltage, means for rectifying the amplified correction voltage, and means for applying the rectified correction voltage across the control coil of said saturable reactor means thereby to increase the magnitude of said impedance and reduce the magnitude of the alternating voltage applied to the input of said rectifying means.

5. A voltage regulator circuit arrangement for regulating the voltage across a load, said load being connected across the output of rectifying means having an input and an output across which is produced a direct output voltage having an alternating current component, comprising a resistor interposed between said load and the output of said rectifying means, saturable reactor means having a control coil and an impedance dependent upon the magnitude of current in said control coil, means for applying an alternating voltage to the input of said rectifying means through said saturable reactor means, a source of direct reference voltage, means for comparing said reference voltage with the peak value of said output voltage during each duty cycle of said alternating current component when the said output voltage exceeds the said reference voltage in magnitude to produce a resultant correction voltage, said comparing means comprising a second rectifier interconnecting the output of said first rectifying means and said reference voltage source, first and second electron discharge devices each having an anode, a cathode and a control grid, means for connecting said comparison means to the control grid of said first discharge device, third rectifying means coupling the anode of said first discharge device to the control grid of said second discharge device, said correction voltage being amplified in said first discharge device and rectified in said second rectifying means, and means for applying the rectified correction voltage across the control coil of said saturable reactor means thereby to increase the magnitude of said impedance and reduce the magnitude of the alternating voltage applied to the input of said rectifying means.

6. A voltage regulator circuit arrangement for regulating the voltage across a load, comprising a controllable voltage source having first input means adapted to be coupled to a source of alternating voltage having a given frequency and first output means to provide a direct current output signal having superimposed thereon an alternating current component having a frequency numerically related to said given frequency, means to couple said output means to said load to provide a load voltage across said load dependent upon said output voltage, a source of direct reference voltage having a predetermined level, comparison means having second input means responsive to said reference voltage and said output voltage to compare said reference and output voltages whenever the peaks of said alternating current component cause the magnitude of said output voltage to exceed said predetermined level and second output means to provide a correction signal dependent upon the difference in magnitudes of said reference and said output voltages so compared, and control means responsive to said control signal and coupled to said controllable voltage source to reduce the magnitude of said output voltage and provide said voltage regulation for said load voltage.

References Cited in the file of this patent

UNITED STATES PATENTS

| | | |
|---|---|---|
| 2,423,134 | Winkler | July 1, 1947 |
| 2,675,515 | Blashfield | Apr. 13, 1954 |
| 2,714,188 | Scherer | July 26, 1955 |
| 2,759,142 | Hamilton | Aug. 14, 1956 |
| 2,875,395 | Blashfield | Feb. 14, 1959 |
| 2,961,594 | Mah | Nov. 22, 1960 |